June 20, 1939.  E. A. SEDLMAYR  2,163,248
SAW-FILING TOOL
Filed Aug. 9, 1937

Eugene A. Sedlmayr
INVENTOR
BY Victor J. Evans & Co.
ATTORNEYS

Patented June 20, 1939

2,163,248

UNITED STATES PATENT OFFICE 2,163,248

SAW-FILING TOOL

Eugene A. Sedlmayr, Delavan, Wis.

Application August 9, 1937, Serial No. 158,190

2 Claims. (Cl. 76—47)

The invention relates to a saw filing tool and more especially to a saw jointer.

The primary object of the invention is the provision of a tool of this character, wherein it is possible to joint a saw in a minimum period of time and with accuracy in a single operation of such tool.

Another object of the invention is to provision of a jointer of this character, wherein the files for both the cutting and raker teeth of a saw are susceptible of adjustment so as to properly level these teeth in their proper relation to each other particularly where the saw is to be used for soft or hard woods or for frozen or thawed woods and also to accommodate the tool to a thick or thin saw for the jointing operation thereof.

A further object of the invention is the provision of a jointer of this character, wherein the same will be guided in the operation thereof for the filing of both the cutter and raker teeth to assure accuracy in the leveling of the teeth with relation to each other.

A further object of the invention is the provision of a jointer of this character, which is simple in construction, thoroughly reliable and efficient in operation, readily and easily handled, relatively light in weight yet strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
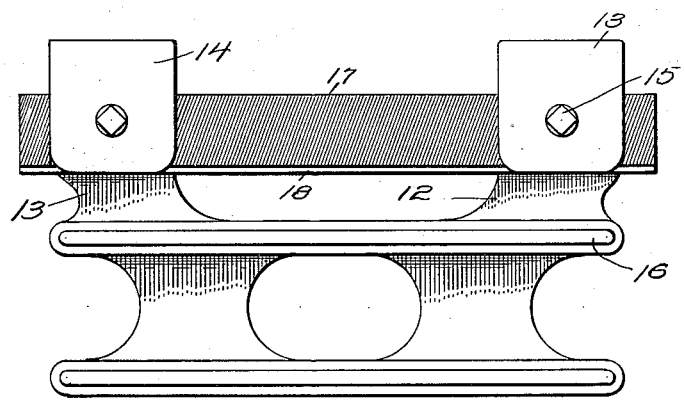
Figure 1 is an elevation of a jointer constructed in accordance with the invention.

Referring to the drawing in detail, A designates generally a portion of a saw blade having the usual cutting and raker teeth 10 and 11, respectively, while B denotes generally the jointer constituting the present invention and hereinafter fully described.

The jointer B comprises a body part 12 preferably made from cast metal and is formed with upstanding webs 13, these being arranged at opposite ends of the body and merge into inverted substantially U-shaped saddles 14 having threaded in opposite sides thereof adjusting screws 15, these being in alignment and opposite each other.

Figure 2:
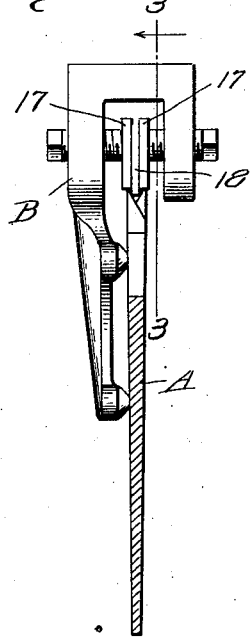
Figure 2 is a vertical transverse sectional view through a saw showing the jointer in elevation applied thereto.
Figure 3:
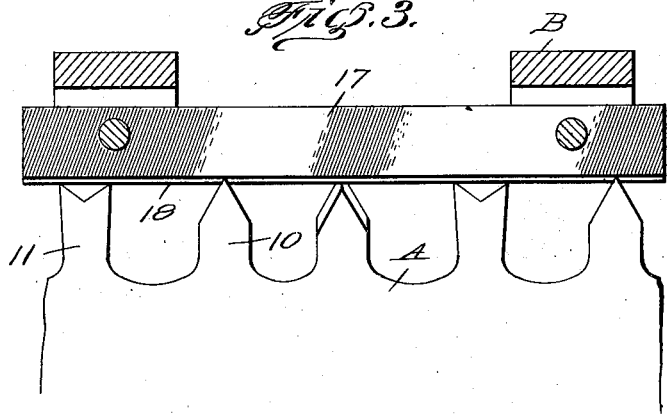
Figure 3 is a fragmentary sectional view taken on the line 3—3 of Figure 2 looking in the direction of the arrow.

The body 12, which actually is the frame of the tool, constitutes a side guard, which at the face adapted to confront the saw blade A has uniformly spaced longitudinally directed runners or contact ribs 16 projected therefrom for engagement with the blade A in the operation of the tool. Adapted to be disposed between the screws 15 and within the saddles 14 are the outer cutting teeth files and an intermediate raker tooth file 17 and 18, respectively, the raker tooth file 18 being disposed and clamped in a lower level with respect to the higher level of the outer cutting teeth files 17 so that in a single operation of the tool the saw blade A can be acted upon for the jointing of the cutting and raker teeth of the same with absolute accuracy in the leveling of these series of teeth with respect to each other. The screws 15 hold and clamp the files 17 and 18 in their relation to each other within the saddles 14. It is, of course, apparent from Figures 1 and 2 of the drawing that these files 17 and 18 can be adjusted for varying the levels of the teeth of the saw blade A and also to accommodate the tool to various thicknesses of saw blades, being necessary that the teeth be differently leveled for the use of the saw in the cutting of soft or hard woods or for thawed or frozen woods. The application of the tool upon the saw blade is clearly shown in Figures 2 and 3 of the drawing and on the shifting of the said tool, that is, the body 12 of the same with the ribs 16 contacting with the blade of the saw, the raker and cutting teeth of the saw blade will be filed in conformity with the level arrangement of the files 17 and 18 within the saddles 14 of said tool.

What is claimed is:

1. A jointer tool for simultaneously jointing the cutting and raker teeth of a saw, comprising a body forming a saw blade guard, inverted substantially U-shaped saddles uppermost with respect to said body, adjusting screws arranged opposite each other and disposed transversely threaded in said saddles, and a plurality of files arranged side by side and clamped by said screws so that the cutting edge of the middle file is slightly below that of the cutting edges of the other files in order to enable jointing the raker teeth along with the cutting teeth.

2. A jointer tool for simultaneously jointing the cutting and raker teeth of a saw, comprising a saw blade guard, clamping means associated with said guard, three files held by the clamping means and arranged that the cutting edge of the middle file is slightly lower than the cutting edges of the other files in order to enable jointing the rake teeth along with the cutting teeth, the middle file being of a thickness corresponding to the space or gap between two rows of cutting teeth, and runners associated with the guard for the saw blade.

EUGENE A. SEDLMAYR.